३,५३२,४८३
Patented Oct. 6, 1970

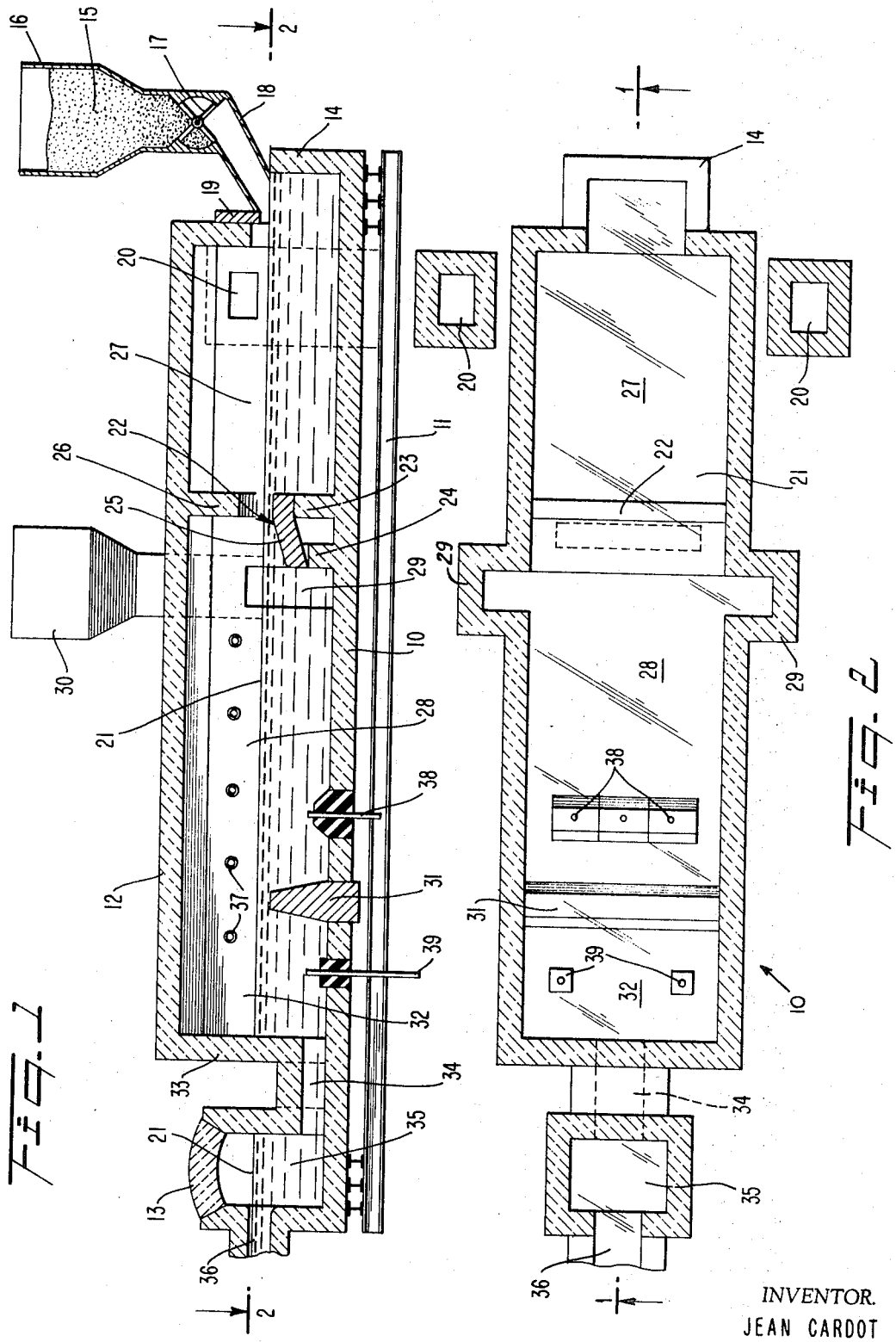

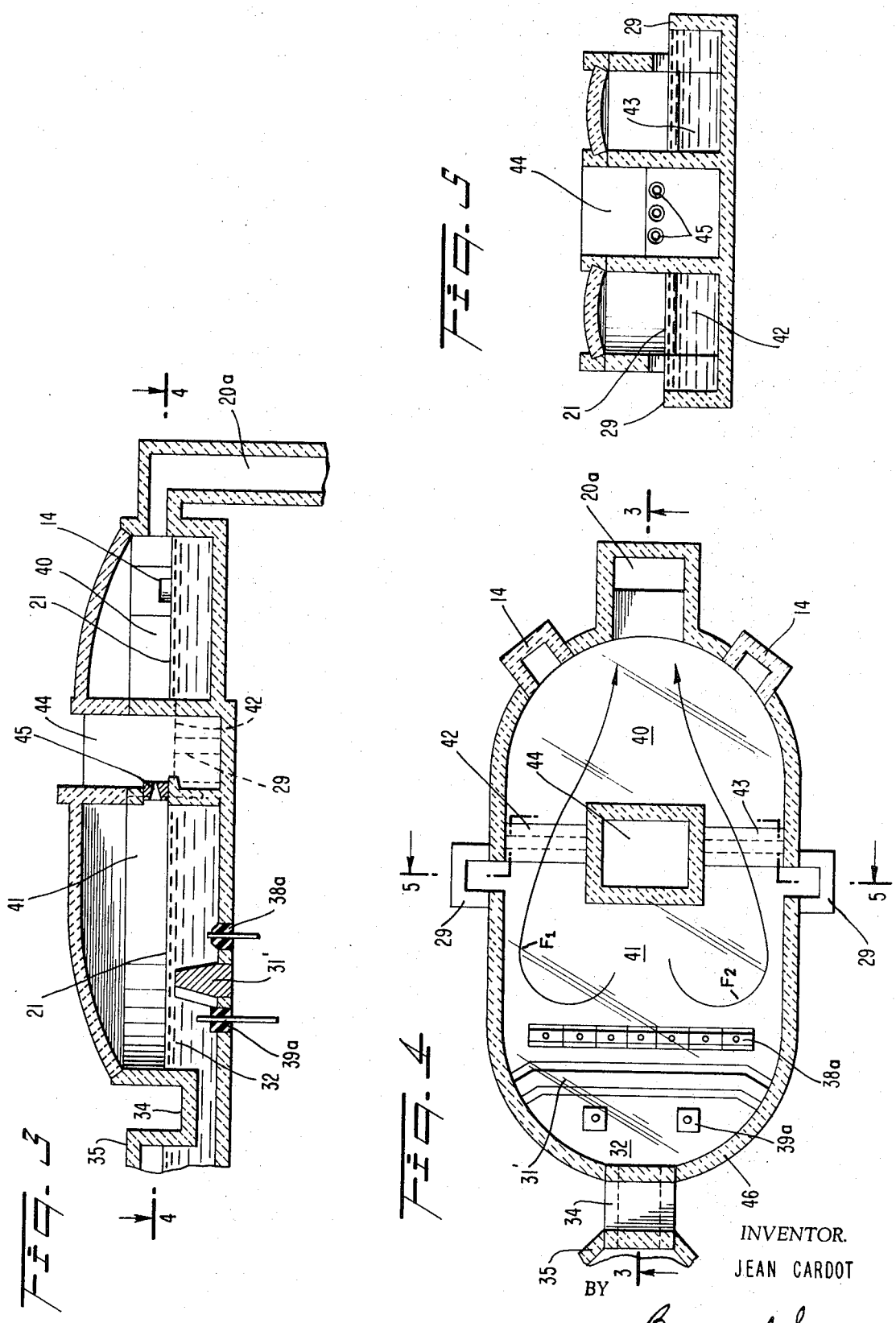

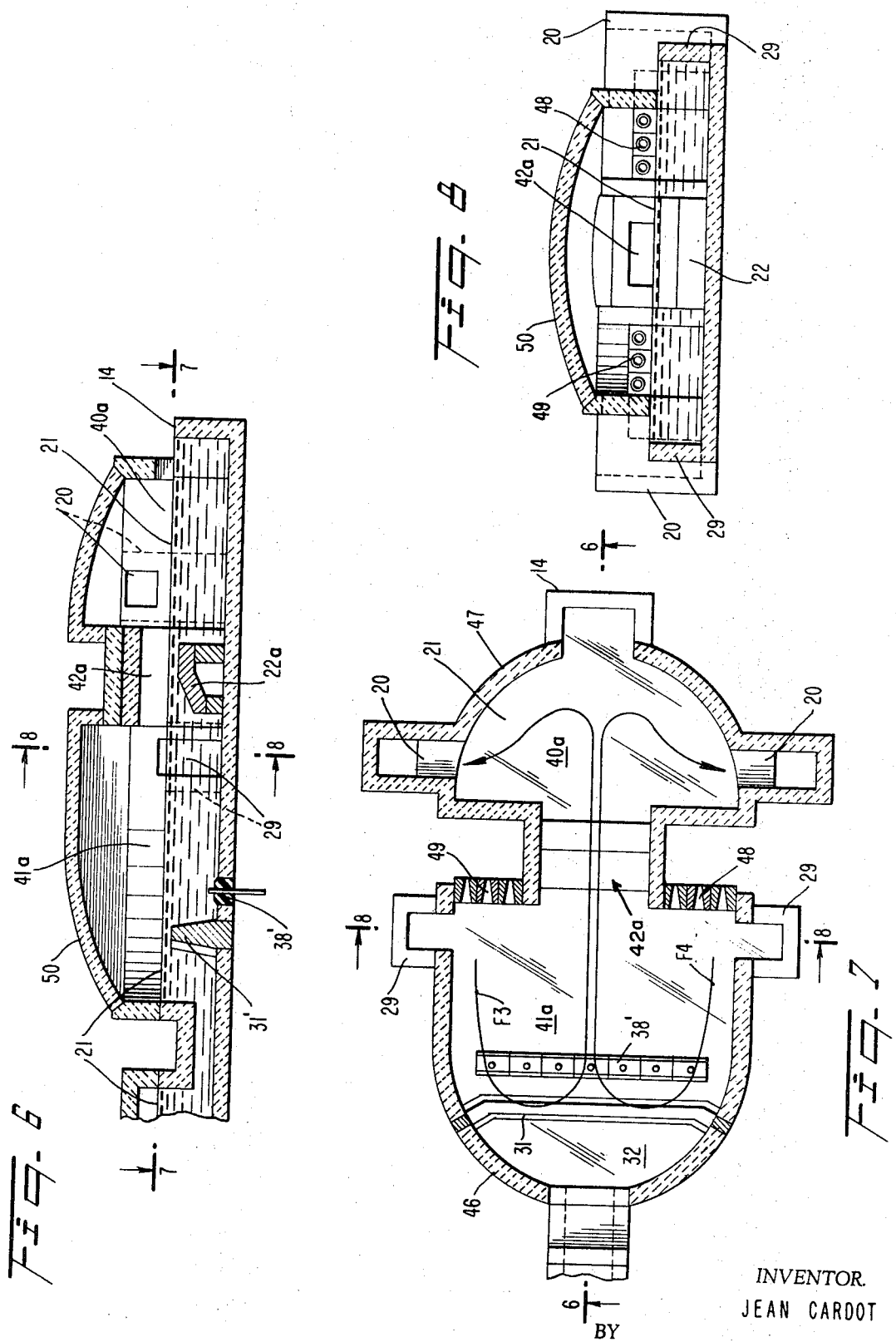

3,532,483
GLASS MELTING WITH DIFFERENT MELTING TEMPERATURE COMPONENTS
Jean Cardot, Paris, France, assignor to Compagnie de Saint-Gobain, Neuilly-sur-Seine, France
Continuation of application Ser. No. 416,711, Dec. 8, 1964. This application Mar. 7, 1968, Ser. No. 711,457
Claims priority, application France, Jan. 3, 1964, 959,284
Int. Cl. C03b 5/16
U.S. Cl. 65—135                    4 Claims

ABSTRACT OF THE DISCLOSURE

Glass making process and apparatus wherein batch materials of different proportions of ingredients are deposited at two separate locations in the furnace, one upstream of the other. The materials deposited at the first or upstream location are relatively poor in high-melting-point ingredients such as silica. This material is first melted at relatively low temperature and as the melt moves downstream, second batch materials of relatively greater percentages of high-melting-point ingredients are added so that the heat from the upstream melt assists in melting the second batch materials and blending the two batch materials to result in a conventional mix, for example soda-lime glass. The downstream area of the melt from about the place of deposit of second batch materials, to the draw pot is preferably flame heated and the gases of combustion after traversing this area, are directed upstream over the area of the upstream melt. Since both the upstream melt and the combustion gases passing thereover, are at a lower temperature than downstream, operation is efficient in conservation of heat.

---

This application is a continuation of application Ser. No. 416,711, filed Dec. 8, 1964.

This invention relates to the manufacture of glass by continuous methods in a tank-type furnace. General principles for such manufacture are known in the glass industry but there are outstanding problems which affect all existing furnaces and methods, the problems of improving the productivity of a furnace, of increasing the efficiency of the process per unit area, and to reduce the consumption of energy per weight unit of glass made. Another problem which has been recognized by glassmakers is that of obtaining both complete melting of all raw materials and a homogeneous compositions of the final product.

It is an object of this invention to improve the efficiency of glass melting, a term which includes the melting of the raw materials to form crude glass, the fining of the crude glass which includes raising its temperature above that which is needed to melt the raw materials, internally working the glass, for instance by setting up currents which flow transversely to the stream of glass as it flows along the tank, conditioning and quieting the glass, and cooling it to a proper temperature for manufacture into articles of commerce.

Another object is to melt glass more rapidly, more completely, and with a reduced consumption of energy.

Another object is to construct a novel furnace which contributes to the achievement of the objects of the invention.

The objects of the invention are accomplished as to apparatus, generally speaking, by a glass furnace having two covered pools adapted to the melting of glass in bulk, the pools being separated by a barrier which permits surface flow of glass between the pools, means to feed the pools separately with raw materials, flame heating means directed upon the downstream pool, and means to flow the tail of the flame over the upstream pool. The apparatus may, optionally, include additional concepts which contribute to its efficiency.

The objects of the invention are accomplished as to process, generally speaking, by forming a pool rich in components of lower melting point than silica, especially the carbonates, and including a minor part of the silica, forming from the melt in said pool a second pool, adding to the second pool raw materials of higher melting point than the carbonates and a major part of the silica, heating the second pool, to a temperature at which the added raw materials melt and the glass is fined, by blowing thereover flame of adequate temperature, thence directing the cooled flame from the second pool over the first pool, and conditioning and working the fined glass from the second pool.

The invention carries out the manufacture of glass in a tank furnace which includes a dome and involves the separation of the vitrifiable materials of glassmaking quality into at least two portions of which the first contains less silica than the second, and contains, generally speaking, the lower melting raw materials, whereas the second portion contains the major part of the silica and, generally speaking, the raw materials which melt at higher temperatures. The lower melting raw materials are admitted at the upstream end of the furnace and are melted there at relatively low temperature and the second group of raw materials is added to the melt as it flows out of the first melting zone into a part of the furnace downstream thereof.

According to a particularly advantageous method the upstream end of the furnace receives essentially the carbonates, calcium carbonate, sodium carbonate, magnesium carbonate and a minor part of the silica. The proportion of silica to be included in this first batch may advantageously be about 1 mole of $SiO_2$ for each mole of alkali oxide, alkaline earth oxide, or magnesium oxide.

The second portion of the raw materials will, under these circumstances, include the amount of silica necessary to provide the desired final composition, and other usually-high-melting ingredients such as alumina, barium hydroxide, and sulfates or other metal compounds which provide ions which improve the fining as they are released by decomposition. It is to be understood that no effort is made to list all the ingredients which may go into one glass or another as it will be apparent to a person skilled in the art into which categories they fall after reading this specification. It is a particular advantage of this invention that the portion of the charge introduced at the upstream end of the furnace is more fusible than the whole charge which is required to make the glass. This primary charge, poor in silica, melts more rapidly, and at lower temperature and furnishes a flux less viscous, which is particularly able to react with the second portion of the raw materials which are rich in silica and other relatively hard-to-fuse ingredients. This reaction occurs more rapidly and more regularly than when all the ingredients are fused together.

Another advantage of the process arises from the fact that the decomposition of the carbonates and the other raw materials in the first batch releases $CO_2$ and water vapor. It is my unexpected discovery that these gases previously caused perturbations in the phenomena of combustion in the fining zone of the furnace, where the highest temperatures are reached, and that, by virtue of the novel process and the novel apparatus, they are withdrawn and escape before that stage of the process is reached. Furthermore, the fusion of the raw materials which are admitted to the upstream end of the furnace can be carried out at a lower temperature than in furnaces of classic type and this has led to novel concepts of process and apparatus in which a flame is applied to the fining zone, downstream of the first melting zone, and the tail of the flame, after it has been cooled, is drawn over the materials being melted at the upstream end of the furnace, its heat still being sufficient to melt the lower melting ingredients contained therein. In order to carry out the invention, a novel furnace has been conceived in which the fusion tank is divided by a transverse weir which establishes what are in effect two tanks, the crude melt from the upstream tank flowing over the weir in a shallow stream into the downstream tank. The upstream tank receives the lower melting ingredients, as explained above, and the lower tank receives the remainder of the ingredients, preferably near the weir. The melting is carried out, preferably, by burners which are placed in the second compartment and can be distributed throughout its length or, preferably, concentrated near the weir.

Just as the melting zone is separated into two compartments, the remainder of the furnace is advantageously separated into two parts by a weir which projects upward from the bottom and provides a shallow passage for the flow of glass and by a depending wall which is connected to a working chamber by a submerged conduit. This depending wall or screen is in proximity to the downstream weir. The apparatus is thus provided with what amounts to four interconnected tanks, the first being upstream of the first weir, the second between the two weirs, the third between the downstream weir and the curtain wall or screen, and the fourth being the working chamber from which the finished glass is withdrawn for manufacture into articles of commerce.

When the furnace is heated by flame, the flame is most intensely applied to the glass between the weirs, or to the glass between the upstream weir and the curtain wall, the tail of the flame proceeds upstream into the first melting chamber arriving there considerably cooled by heat lost to the glass and furnace wall downstream but still at a temperature which is efficient in the melting of the raw materials contained in that chamber.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings wherein like reference characters refer to like parts throughout the several views, FIG. 1 is a vertical longitudinal section through a glass furnace of a novel design which is adapted to carry out the novel process of this invention;

FIG. 2 is a horizontal section on line 2—2 of FIG. 1;

FIG. 3 is a vertical longitudinal section through a modified and highly efficient form of the invention;

FIG. 4 is a horizontal section on line 4—4 of FIG. 3;

FIG. 5 is a transverse section on line 5—5 of FIG. 4, facing downstream;

FIG. 6 is a vertical longitudinal section through another modified form of the novel furnace;

FIG. 7 is a horizontal section on the line 7—7 of FIG. 6; and

FIG. 8 is a vertical transverse section on the line 8—8 of FIGS. 6 and 7, facing upstream.

Referring to the furnace of FIGS. 1 and 2, a tank 10 composed of suitable refractory material, mounted on metal rails 11 is provided with a dome 12 and a dome 13. The tank is provided at its upstream end 14 with a doghouse which receives a supply of raw materials 15 from hopper 16 which delivers its contents, quadrant by quadrant of the rotary valve 17 to a chute 18 which, in connection with movable door 19, covers the opening to the doghouse. This makes the furnace tight at its upstream end except for flues 20 which are connected to heat recouperators or regenerators of suitable type, the construction of which is well known.

A glass level is established by admitting raw materials as finished glass is withdrawn and this glass level is indicated at 21.

A weir 22 extends upward from the bottom to a position a little below the glass level, thus providing for the flow of a shallow stream of glass. The weir, as constructed in this form of the invention, includes two upright walls 23, 24 of different height which support a plate 25, the upper surface of which is canted downwardly so as to deliver the molten materials upstream to a position toward the bottom of the fresh raw materials floating on the surface of the downstream compartment.

A depending wall 26 above the weir extends from wall to wall and to a level somewhat above the surface of the glass so that the aperture between the weir and the depending wall allows for the flow of glass downstream and the flow of hot gases upstream. A relatively thin layer of glass passing over the weir is thus subjected to concentrated heating at the temperature of the gas which passes in a relatively thin stream beneath the wall. This makes for efficient heat exchange. The first chamber will be called 27 and the second 28. The second chamber is provided with doghouses 29 which extend outside its walls and which are provided with hoppers 30 for the introduction of the second batch of raw materials. The construction of the doghouses and their feeding devices are substantially the same as that which has been described with relation to numbers 14 to 19. These feeding devices supply to the melt coming from chamber 27 those higher melting ingredients which are necessary to make the perfect glass.

Downstream of the doghouses 29 a second weir 31 extends across the furnace, beneath the glass level, allowing a shallow current of glass to flow above it. This glass enters a chamber 32 which is limited by the curtain wall 33 which forms the end of the dome of the furnace. This wall extends to the bottom of the tank 10 except at its central point where a conduit 34 extends along the bottom to a chamber 35 which constitutes a working chamber from which glass is drawn through a forehearth 36 for distribution to bottle-forming machines or other apparatus. The consumption of glass by these machines maintains a flow of glass along the furnace during the course of which it is melted, fined and conditioned. The passage or conduit 34 may have such dimensions as will contribute to the delivery of the glass to the working chamber 35 at a satisfactory temperature.

In the operation of this furnace the input of raw materials by the three hoppers will match the withdrawal of completed glass by the machines. The hopper 16 will receive the low melting constituents and only a small part of the silicia, whereas the hoppers 30 will receive the major part of the silica and other high melting constituents. The furnace as shown is heated by flame by burners 37 which are shown as extending evenly along the walls of chambers 28 and 32, from the doghouses 29 to the curtain wall 33. The most intense part of their activity is thus directed upon the glass downstream of the first weir and a substantial portion of the heat content of the flame is withdrawn in that region, producing the fining of the glass before it enters the passage or conduit 34 and particularly as it passes in a relatively shallow stream over the second weir 31. Within the chamber 28 the final melting of all ingredients takes place, including the necessary reactions between the ingredients melted in first chamber 27 and second chamber 28. The flame passes from chamber 28 into chamber 27 beneath the wall 26 and arrives in the upstream chamber at a temperature which is lower than that required for fining but efficient for fusing the low melting ingredients.

The uniform disposal of the burners in FIG. 1 may be varied to concentrate the heat where it is most needed for the proper functioning of the process proceeding in chambers 28 and 32. All gases released by the glass in chambers 28 and 32 are swept along with the flame into chamber 27 and because of their temperture contribute to the melting. Bubblers 38 may be mounted in the floor of the furnace upstream of the weir 31 to assist in sweeping out the bubbles which form in the glass during the fining operation.

In order to insure the uniformity of the glass and, if desired, to achieve the highest temperature thereof in the compartment 32 electrodes 39 may be mounted therein to operate by Joule effect both to impart internal heat to the glass and to set up vertical currents which work the glass and improve its homogeneity.

In a modified form of the invention, as displayed in FIGS. 3, 4 and 5, there are in effect two chambers 40 and 41 which are interconnected above weirs 42, 43 which abut the side walls of the furnace at their outer ends and a centrally constructed stack 44 at their inner ends. This stack is open at its top (FIG. 5), is constructed of refractory masonry and is equipped with apertures 45 for oil burners or the like which are aimed into the chamber 41 and develop flame paths illustrated by $F_1$ and $F_2$ in FIG. 4. The shape of these arrows can be made to vary by the velocity which is imparted to the flame. Bubblers 38a and electrodes 39a may be employed above and below the weir 31' which has angularly placed ends to meet the curved end wall 46 of the furnace.

The operation of this structure is similar to that of FIGS. 1 and 2, although the doghouses and the regenerator passage 20a have different positions.

In the form of the invention shown in FIGS. 6, 7 and 8, the hopper chamber 40a is connected to the lower chamber 41a by a vertically and horizontally constricted throat 42a which extends above the weir 22a. The doghouse and gas ports are arranged similarly to FIG. 1. Both end walls 46 and 47 are curved in order to control the path of the flame. The burner ports 48, 49 are located on opposite sides of the constricted throat 42a and furnish ready access for attention. Their flames are directed downstream over the position of the bubblers 38 in lower or downstream chamber 41a and above the weir 31'. Under compulsion by the shape of the chamber the curved roof of which approaches the level of the glass, as shown at 50, FIG. 6, the flame is brought close to the glass and flows from opposite sides to the center and then upstream as shown by the arrows $F_3$ and $F_4$, FIG. 7, until it passes through throat 42a and into chamber 40a where it is again shaped by the wall to sweep over the entire surface of the constituents which are being melted there.

The following is a general description of the operation as it may be carried out in the apparatus which has been described. The glass described is of a known type which is employed in the making of glass bottles.

Glass having the following constitution was to be made:

|  | Percent by wt. |
|---|---|
| $SiO_2$ | 72 |
| CaO | 9 |
| $Na_2O$ | 14 |
| MgO | 2 |
| $Al_2O_3$ | 2 |
| BaO | 0.5 |
| Other materials | 0.5 |

The raw materials were divided into two portions in the first of which was included the carbonates and the quantity of silica necessary to transform them to silicates. The weight distribution was as follows:

|  | Percent by wt. |
|---|---|
| Calcium carbonate | 10.7 |
| Sodium carbonate | 24 |
| Dolomite | 9 |
| Sand | 26.9 |

This mixture melts easily, a temperature of 1270° to 1300° C. being sufficient to fuse the mass and prevent devitrification, that is to say, that the fusion of this first mixture can be readily achieved by means of the calories which remain in the tail of the flame, that is to say, in the products of combustion which flow from the active zone of the furnace in which the temperature is circa 1500° C.

The remaining raw materials are injected into the furnace downstream of the first weir, in this case as follows:

|  | Percent by wt. |
|---|---|
| Sand | 46.1 |
| Hydrated alumina | 3 |
| Barium sulfate | 0.8 |

For the manufacture of bottles the hydrated alumina can be replaced by feldspar. According to another variation, a part of the soda and/or of the lime may be introduced not only above the first weir as carbonates but below that weir as sulfate. This facilitates the digestion of the sand during its decomposition and aids the fining of the glass.

If it is desired to use cullet in the furnace, it can be broken and introduced either with the first or the second batch of raw material, either above or below the first weir or in both places at once.

The hot gases issuing from the active zone of the furnace are reduced in temperature to about 1250 to 1300° by the time they leave the furnace, which gives a supplementary advantage because they can be accepted without inconvenience in a regenerator of metallic or of brickwork type.

Although the invention has been described particularly in relation to the manufacture of hollow glass, involving transverse weirs which delimit the compartments of fusion, fining and conditioning, it is equally useful in furnaces for making flat glass (window glass and plate glass). In this case, it is usually sufficient to provide a weir between the two sets of doghouses, one supplying its material above and the other below the weir.

The invention is equally applicable to the manufacture of other types of glass, for example, silica-soda-calcium glass containing no magnesia.

The types of furnace set forth herein are new. While they may be varied as circumstance requires, they have certain common characteristics: the melting zone is divided by a weir in two compartments or chambers, each of which reecives its particular raw materials. According to another characteristic, the burners are disposed in the second compartment of the fusion zone, either near the weir or distributed along the sides of that compartment, grouped as required for efficient results, while the exhaust flues issue from the upstream compartment. Under these conditions, the hotest part of the furnace is found in the compartment into which the flames are injeced, the product of combustion passing thence over the weir and into the upstream compartment. In general, fusion and fining is completed in the compartments 28 and 41, the hottest zone being over or somewhat upstream of the second weir. The complete homogenization of glass is calculated to be completed by the time the glass has passed the downstream weir, the compartments downstream of the lower weir being intended to quiet the glass and reduce its temperature somewhat, its final working stage being attained as it accumulates in the work chamber 35.

The advantages of the process are the production of more perfect glass with greater efficiency and lower cost. The advantage of the furnace is in superior handling of materials, control of the process, and more efficient use of fuel.

As many apparently widely different embodiments of the present invention may be made without departing from the spirit and scope thereof, it is to be understood that the invention is not limited to the specific embodiments.

What is claimed is:

1. The method of making silica-containing glass which comprises dividing the raw materials of the glass composition into a division of higher melting point and a division of lower melting point, including in that of lower melting point raw materials of the type of the carbonates of alkali metals, alkaline earth metals, and magnesium and a minor amount of the silica but enough to transform such raw materials to silicates, including in that of higher melting point the major proportion of the silica and raw materials of the type of hydrated alumina, the sulfates of alkali and alkaline earth metals, and feldspar, melting the division of lower melting point into a pool at a low temperature below about 1300° C., mixing the division of higher melting point with the said pool, heating the mixture to materially higher temperature above 1300° C., adequate to the fusion of the mixture until melting is completed, and cooling and quieting the glass.

2. The method of claim 1 in which the melt of lower melting point flows from its pool into a second pool wherein it receives the division of higher melting point and is heated to the higher melting temperature.

3. The process according to claim 2 in which the heating of the two pools is by flame initially applied to the hotter pool and thereafter blown at reduced temperature over the cooler pool.

4. The method of claim 3, continuously flowing said first batch ingredients into a first chamber, continuously flowing melted first batch ingredients from said first chamber into a second chamber, and continuously adding to the melt in said second chamber, the balance of said batch ingredients, to produce glass having said predetermined batch ingredients and proportions thereof.

References Cited

UNITED STATES PATENTS

| | | | |
|---|---|---|---|
| 1,759,228 | 5/1930 | Drake | 65—135 |
| 1,970,112 | 8/1934 | Wadman | 65—335 XR |
| 2,658,095 | 11/1953 | Arbeit et al. | 65—135 XR |
| 2,817,191 | 12/1957 | Hamilton | 65—134 XR |
| 2,890,547 | 6/1959 | Lyle | 65—134 |
| 3,330,638 | 7/1967 | Brown | 65—134 |
| 3,350,213 | 10/1967 | Peyches | 65—60 XR |

FRANK W. MIGA, Primary Examiner

U.S. Cl. X.R.

65—337, 346